Patented Aug. 1, 1944

2,354,846

UNITED STATES PATENT OFFICE 2,354,846

N-POLYHYDROXYALKYL-PHENYLAMINES AND METHOD FOR THEIR PREPARATION

Friedrich Weygand, Heidelberg, Germany, assignor to Winthrop Chemical Company, Inc., New York, N. Y., a corporation of New York No Drawing. Application March 14, 1941, Serial No. 383,345. In Germany April 6, 1940

21 Claims. (Cl. 260—211)

This invention relates to a process of manufacturing N-phenyl-isoglycosamines and N-polyhydroxyalkyl-phenylamines.

It is known that the glucosides obtained by melting d-glucose with para-toluidine, para-phenetidine or para-anisidine and having for instance the formula

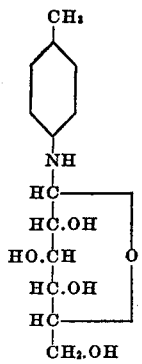

readily are isomerized to corresponding isoglucosamines having for instance the formula

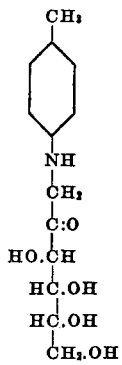

In this manner also N-(3.4-dimethylphenyl)-d-iso-glucosamine has been obtained by melting 3.4-dimethyl-aniline with d-glucose. The yields, however, of that process are slight and it was not possible to perform the same reaction with other sugars than glucose and with certain amines other than those mentioned above. Many N-glycosides of primary amines could not be rearranged in the manner indicated above. Such rearrangement ("Amadori's rearrangement") only has been observed with certain N-glycosides of the d-glucose.

In accordance with the present invention the rearrangement to iso-glucosamines of the N-phenylamino-glucosides which are known as being capable of such a rearrangement may be performed considerably more readily and with improved yield and may also be effected with such N-phenylamino-glycosides which could not be rearranged under the conditions formerly employed when subjecting N-phenylamino-glycosides to the action of a small quantity of an acid reacting medium, that is of a free acid or of an acid reacting salt. The reaction is advantageously carried out in the presence of a relatively small quantity of a diluent such as water or a lower alcohol. The glycoside derivatives of aniline itself as well as of its nuclear substitution products may be used as N-phenylamino-glycosides. Thus for instance the glycoside of the various toluidines, xylidines and other alkyl anilines, alkoxy anilines, halogenated anilines and the like can be employed as starting materials. Accordingly the term N-phenylamino-glycosides as used in this specification and the appended claims is intended to include the glycoside derivatives of aniline as well as of its substitution products. The same applies when using the term phenyl in other connection, for instance, when referring to N-phenyl-iso-glycosamines, N-polyhydroxyalkylphenylamines and the like.

In the said rearrangement reaction it is not necessary to start with the N-phenylamino-glycosides in the isolated state; the rearrangement rather may be effected in one working stage with the manufacture of the N-phenylamino-glycosides from the phenylamine and an aldose. Acid reacting media which are suitable as catalysts in the rearrangement reaction may be of the most different kind; they may be inorganic or organic acids such as hydrohalic acids, sulfuric acid, nitric acid, phosphoric acid, formic acid, acetic acid, propionic acid, valeric acid, lactic acid, succinic acid, citric acid, benzoic acid, nitrobenzoic acid, phenylacetic acid and the like; furthermore salts may be used as acid reacting media which have an acid reaction in the reaction mixture, such as ammonium chloride and zinc chloride. Since only a small quantity of the acid medium is required, it is advantageously added to the reaction mixture in a dilute state, for instance in the form of 2-normal sulfuric acid or nitric acid or hydrochloric acid or acetic acid or 8 per cent phosphoric acid. In general a quantity of about 0.002 mol to about 0.02 mol upon 1 mol of the phenylamino-glycoside has proved to be sufficient for catalyzing the reaction. A large excess of the acid reacting medium should be avoided since this may be disadvantageous for the reaction. The rearrangement reaction is advantageously accelerated by moderately increased temperature, for instance by a temperature of 70° C. or by the temperature of the boiling water bath or even by still higher temperature. From the reaction mixture the N-phenyl-iso-glycosamines formed can readily be separated, for instance by the addition of alcohol to the cooled reaction mixture; sometimes it is advisable to use a mixture of alcohol and ether for this purpose.

The N-phenyl-iso-glycosamines thus obtainable can be readily converted into the corresponding N-phenyl-polyhydroxy-alkylamines by catalytic hydrogenation. In order to avoid by-reactions the reaction mixture is advantageously kept weakly alkaline during the hydrogenation.

The invention is furthermore illustrated by the following examples without, however, being restricted thereto:

Example 1

10 grams of glucose, 8 grams of para-toluidine, 2.5 ccs. of water and 0.5 cc. of 2-normal formic acid are heated in a boiling water bath for 10 minutes. Then 20 ccs. of absolute alcohol are added. The mixture is cooled. After 24 hours the para-tolyl-d-isoglucosamine precipitated is filtered with suction. Yield 7 grams.

Example 2

10 grams of glucose, 8 grams of para-toluidine, 2.5 ccs. of water and 0.5 cc. of 2-normal sulfuric acid are heated in a boiling water bath for 10 minutes. Then 20 ccs. of absolute alcohol are added. The mixture is cooled. After 24 hours the para-tolyl-d-isoglucosamine precipitated is filtered with suction. Yield 7.4 grams.

Example 3

10 grams of glucose, 8 grams of para-toluidine, 2.5 ccs. of water and 0.5 cc. of 2-normal nitric acid are heated in a boiling water bath for 10 minutes. Then 20 ccs. of absolute alcohol are added. The mixture is cooled. After 24 hours the para-tolyl-d-isoglucosamine precipitated is filtered with suction. Yield 7.9 grams.

Example 4

10 grams of glucose, 8 grams of para-toluidine, 2.5 ccs. of water and 0.5 cc. of an 8 per cent solution of phosphoric acid are heated in a boiling water bath for 10 minutes. Then 20 ccs. of absolute alcohol are added. After 24 hours the para-tolyl-d-isoglucosamine precipitated is filtered with suction. Yield 7.4 grams.

Example 5

10 grams of glucose, 8 grams of para-toluidine, 3 ccs. of water and 0.5 gram of benzoic acid are heated in a boiling water bath for 10 minutes. Then 20 ccs. of absolute alcohol are added. After 24 hours the para-tolyl-d-isoglucosamine periciptated is filtered with suction. Yield 8.5 grams.

Example 6

10 grams of glucose, 8 grams of para-toluidine, 3 ccs. of water and 0.5 gram of succinic acid are heated in a boiling water bath for 10 minutes. Then 20 ccs. of absolute alcohol are added. After 24 hours the para-tolyl-d-isoglucosamine precipitated is filtered with suction. Yield 8 grams.

Example 7

10 grams of glucose, 8 grams of para-toluidine, 3 ccs. of water and 0.5 gram of azelaic acid are heated in a boiling water bath for 10 minutes. Then 20 ccs. of absolute alcohol are added. After 24 hours the para-tolyl-d-isoglucosamine precipitated is filtered with suction. Yield 8.2 grams.

Example 8

10 grams of glucose, 8 grams of para-toluidine, 3 ccs. of water and 0.5 gram of aspartic acid are heated in a boiling water bath for 10 minutes. Then 20 ccs. of absolute alcohol are added. After 24 hours the para-tolyl-d-isoglucosamine precipitated is filtered with suction. Yield 8 grams.

Example 9

10 grams of glucose, 8 grams of para-toluidine, 3 ccs. of water and 0.5 gram of zinc chloride are heated in the boiling water bath for 20 minutes. Then 20 ccs. of hot absolute alcohol are added whereupon the mixture is filtered off from a small quantity of an undissolved residue and the solution is cooled. After 24 hours the para-tolyl-d-isoglucosamine precipitated is filtered with suction. Yield 7 grams.

Example 10

10 grams of glucose, 8 grams of para-toluidine, 3 ccs. of water and 0.5 gram of ammonium chloride are heated in a boiling water bath for 20 minutes. Then 20 ccs. of absolute alcohol are added. After 24 hours the para-tolyl-d-isoglucosamine precipitated is filtered with suction. Yield 6.8 grams.

Example 11

10 grams of glucose, 8 grams of para-toluidine, 2 ccs. of water and 1 cc. of 2-normal acetic acid are heated in a boiling water bath for 20 minutes. Then 20 ccs. of absolute alcohol are added. After 24 hours the para-tolyl-d-isoglucosamine precipitated is filtered with suction. Yield 6.8 grams.

Example 12

100 grams of glucose, 80 grams of para-toluidine, 25 ccs. of water and 5 ccs. of 2-normal hydrochloric acid are heated in a boiling water bath for 30 minutes. Then 100 ccs. of absolute alcohol are added. The para-tolyl-d-isoglucosamine at once begins to crystallize out. After 24 hours it is filtered with suction, washed with a mixture of alcohol and ether (2 to 3) and dried at 100° C. Yield 91 grams.

Example 13

10 grams of glucose, 8 grams of para-toluidine, 10 ccs. of ethylene glycol and 0.5 cc. of 2-normal acetic acid are heated in a boiling water bath for 25 minutes. The mixture is cooled. Then 10 ccs. of absolute alcohol and some time later 20 ccs. of ether are added. After 24 hours the para-tolyl-d-isoglucosamine precipitated is filtered with suction. Yield 6.5 grams.

Example 14

10 grams of glucose, 8 grams of para-toluidine, 3 ccs. of water, 1 cc. of 2-normal hydrochloric acid and 20 ccs. of absolute alcohol are heated under reflux for 20 minutes. The mixture is cooled. Then the para-tolyl-d-isoglucosamine crystallizes out. Yield 4 grams.

Example 15

20 grams of cane sugar, 7 ccs. of water and 1 cc. of 2-normal hydrochloric acid are heated in a boiling water bath for 7 minutes. Then 8 grams of para-toluidine are added and the mixture is again heated. Already one minute later the mixture is homogeneous which proves that condensation between the glucose contained in the invert sugar and the para-toluidine has taken place. After 8 minutes 20 ccs. of absolute alcohol are added to the mixture which is then cooled. After 24 hours the para-tolyl-d-isoglucosamine precipitated is filtered with suction. Yield 5.8 grams. It melts at 154 to 155° C.

*Example 16*

5.0 grams of d-mannose, 4 grams of para-toluidine, 1.5 ccs. of water and 0.3 cc. of 2-normal hydrochloric acid are heated in an oil bath of 140° C. At first the mixture becomes semiliquid, then solid under formation of the d-mannoside, and thereupon again semiliquid. Within 7 minutes the temperature rises to 107° C. 40 ccs. of absolute alcohol are added to the still hot mixture and the product undissolved at once is centrifuged off. From the solution the para-tolyl-d-isoglucosamine crystallizes out. Yield 1.3 grams. It melts at 153 to 154° C.

*Example 17*

10 grams of glucose, 8 grams of para-phenetidine, 2.5 ccs. of water and 0.5 gram of 2-normal acetic acid are heated in a boiling water bath for 15 minutes. Then 20 ccs. of absolute alcohol are added whereupon crystallization at once begins. After 24 hours the para-phenetidyl-d-isoglucosamine precipitated is filtered with suction. Yield 9.5 grams. It melts at 154° C.

*Example 18*

10 grams of glucose, 8 grams of para-phenetidine, 2.5 ccs. of water and 0.5 cc. of 2-normal hydrochloric acid are heated in a boiling water bath for 15 minutes. Then 20 ccs. of absolute alcohol are added. After 24 hours the para-phenetidyl-d-isoglucosamine precipitated is filtered with suction. Yield 9.4 grams.

*Example 19*

14 grams of glucose, 11 grams of 3.4-dimethyl-aniline, 3 ccs. of water and 2 ccs. of 2-normal hydrochloric acid are heated in a boiling water bath for 11 minutes. Thereupon the mixture being at first pasty solidifies. After addition of 20 ccs. of absolute alcohol the mixture is stirred in a boiling water bath for 2 minutes. The mixture is cooled and left standing for some time. Then the N-(3.4-dimethylphenyl)-d-isoglucosamine precipitated is filtered with suction. Yield 15 grams.

*Example 20*

20 grams of glucose, 16 grams of para-anisidine, 5 ccs. of water and 1 cc. of 2-normal hydrochloric acid are heated in a boiling water bath for 20 minutes. Then 40 ccs. of absolute alcohol are added. After 24 hours the para-anisidyl-d-isoglucosamine precipitated is filtered with suction and washed with a mixture of alcohol and ether (2 to 3). Yield 17.1 grams. It melts at 143 to 144° C.

*Example 21*

8 grams of d-arabinose, 6.5 grams of 3.4-dimethyl-aniline, 2.0 ccs. of water and 1.5 ccs. of 2-normal acetic acid are heated in a water bath of 75° C. for 6 minutes. The mixture is cooled and then 20 ccs. of absolute alcohol are added. The solution of the N-(3.4-dimethylphenyl)-d-isoarabinosamine formed is added to 0.5 gram of a prehydrogenated platinum catalyzer (according to Adams) which is suspended in 25 ccs. of absolute alcohol and 3 ccs. of 2-normal sodium hydroxide solution. Upon shaking the mixture with hydrogen, absorption of hydrogen at once takes place and ceases after 120 minutes. 300 to 350 ccs. of hydrogen are absorbed. The catalyzer having been removed by centrifuging, 1.5 ccs. of 2-normal acetic acid are added to the mixture for neutralization whereupon steam is introduced into the solution. First the alcohol and then unchanged 3.4-dimethyl-aniline distill over. As soon as no more dimethyl-aniline distills over the steam distillation is broken off. A small quantity of animal charcoal is added to the remaining solution which is filtered when still hot. After cooling 2-normal sodium hydroxide solution is added drop by drop to the solution until it reacts alkaline to litmus. Very soon the 3.4-dimethyl-1-(d-ribitylamino)-benzene begins to crystallize out. Should the solution be too diluted because of the steam distillation, it is concentrated under diminished pressure. The product obtained is purified by recrystallization from absolute alcohol or water. Yield 1 to 1.5 grams. It melts at 140° C. (uncorrected), $[\alpha]_D^{20}=-31°$ C. From the mother liquor the unchanged d-arabinose which may be used for a new batch is obtained.

*Example 22*

10 grams of 1-arabinose, 8 grams of para-toluidine, 3 ccs. of water and 2 ccs. of 2-normal acetic acid are heated in a water bath of 75° C. for 5 minutes. Then the mixture is cooled. 20 ccs. of absolute alcohol are added. The solution of the N-(para-tolyl)-1-isoarabinosamine formed is added to 1 gram of a prehydrogenated platinum catalyzer (according to Adams) which is suspended in 25 ccs. of absolute alcohol and 4 ccs. of 2-normal sodium hydroxide solution. Upon shaking the mixture with hydrogen, absorption of hydrogen at once takes place and ceases after 1 hour. The catalyzer is centrifuged off and 2 ccs. of 2-normal acetic acid are added to the solution. Now a steam distillation is carried out. As soon as no more unchanged toluidine distills over, the steam distillation is broken off and the remaining solution is filtered when still hot. After cooling 2-normal sodium hydroxide solution is added drop by drop until the solution reacts alkaline to litmus. The solution is concentrated under diminished pressure. Thereupon at first 0.65 gram of N-(1-ribityl)-para-toluidine and later on while standing 0.75 gram of N-(1-arabityl)-para-toluidine crystallize out. The compounds may be purified by recrystallization from water.

*Example 23*

10 grams of d-xylose, 8 grams of para-toluidine, 3 ccs. of water and 2 ccs. of 2-normal acetic acid are heated in a water bath of 75° C. for 4 minutes. After cooling 20 ccs. of absolute alcohol are added. The solution of the N-(para-tolyl)-d-isoxylosamine formed is added to a suspension of a prehydrogenated platinum catalyzer which is suspended in 25 ccs. of absolute alcohol and 4 ccs. of 2-normal sodium hydroxide solution. Upon shaking the mixture with hydrogen absorption of hydrogen at once takes place and ceases after 1 hour. After separating off the catalyzer, 2 ccs. of 2-normal acetic acid are added to the solution. By a steam distillation the alcohol and unchanged para-toluidine are removed. As soon as no more para-toluidine distills over with the steam, the steam distillation is broken off and the still hot solution is filtered under addition of animal charcoal. After cooling 2-normal sodium hydroxide solution is added drop by drop until the solution reacts alkaline to litmus. The solution is concentrated under diminished pressure. While concentrating the N-(d-lyxidyl)-paratoluidine precipitates. Yield 1.8 grams. It melts at 153 to 154° C. after recrystallization from 50 per cent alcohol; $[\alpha]_D = +26.1°$ C. in pyridine.

*Example 24*

10 grams of glucose, 8 grams of aniline, 3 ccs. of water and 0.5 cc. of 2-normal hydrochloric acid are heated in a boiling water bath for 12 minutes. Then 20 ccs. of absolute alcohol are added. The solution of the N-phenyl-d-isoglucosamine formed is added to 0.5 gram of a prehydrogenated platinum catalyzer which is suspended in 25 ccs. of absolute alcohol and 2.5 ccs. of 2-normal sodium hydroxide solution. Upon shaking the mixture with hydrogen absorption of hydrogen at once takes place and ceases after 2 hours. The hydrogenation product crystallized out during this time is centrifuged off together with the catalyzer. Thereupon the N-phenyl-d-mannamine is separated from the catalyzer by dissolving in a small quantity of hydrochloric acid and is reprecipitated by adding a solution of sodium hydroxide to the hydrochloric solution. It is recrystallized from absolute alcohol. Yield 2 grams. It melts at 175 to 176° C.

*Example 25*

10 grams of d-galactose, 8 grams of para-toluidine, 3 ccs. of water and 0.5 cc. of 2-normal hydrochloric acid are heated in a boiling water bath. After a few minutes the mixture is homogeneous and the para-toluidine-d-galactoside partially begins to crystallize out. After the sixth minute further 0.5 cc. of 2-normal hydrochloric acid are added and the mixture is again heated for 6 minutes. Then 30 ccs. of absolute alcohol are added. For the hydrolysis for the unrearranged para-toluidine-d-galactoside alcohol of 50 per cent and diluted hydrochloric acid are added until the solution shows an acid reaction. The solution is then heated for some minutes. The solution contains the hydrochloride of the N-(para-tolyl)-d-iso-galactosamine.

I claim:

1. An N-phenyl-isopentosamine.
2. An N-(3.4-dimethylphenyl)-isopentosamine.
3. An N-phenyl-d-iso-arabinosamine.
4. N-(3.4-dimethylphenyl)-di-iso-arabinosamine.
5. A process for preparing N-phenyl-isoglycosamines which comprises the step of effecting a molecular rearrangement of the N-phenylaminoglycosides by subjecting the latter to the catalyzing action of about .002–.02 mol of an acid reacting medium per mol of the phenylaminoglycoside in 2–4 mols of a diluent selected from the group consisting of water and a lower molecular weight alcohol.
6. A process for preparing N-phenyl-isoglycosamines which comprises the step of effecting a molecular rearrangement of the N-phenylaminoglycosides by subjecting the latter to the catalyzing action of about .002–.02 mol of an acid reacting medium per mol of the phenylaminoglycoside in 2-4 mols of a diluent selected from the group consisting of water and a lower molecular weight alcohol while substantially simultaneously forming such N-phenylaminoglycosides from a phenylamine and an aldose.
7. A process for preparing N-phenyl-isoglycosamines which comprises the step of effecting a molecular rearrangement of the N-phenylaminoglycosides by subjecting the latter to the catalyzing action of about .002–.02 mol of an acid reacting medium per mol of the phenylaminoglycoside in 2–4 mols of a diluent selected from the group consisting of water and a lower molecular weight alcohol while heating the reaction mixture to a moderately increased temperature of the order of a temperature ranging from about 70° C. to about 100° C.
8. A process for preparing N-phenyl-isoglycosamines which comprises the step of effecting a molecular rearrangement of the N-phenylaminoglycosides by subjecting the latter to the catalyzing action of about .002–.02 mol of an acid reacting medium per mol of the phenylaminoglycoside in 2–4 mols of a diluent selected from the group consisting of water and a lower molecular weight alcohol while heating the reaction mixture to a moderately increased temperature of the order of a temperature ranging from about 70° C. to about 100° C. for a short period of time ranging up to about 30 minutes.
9. A process for preparing N-phenyl-isoglycosamines which comprises the step of effecting a molecular rearrangement of the N-phenylaminoglycosides by subjecting the latter to the catalyzing action of about .002–.02 mol of an acid reacting medium per mol of the phenylaminoglycoside in 2–4 mols of a diluent selected from the group consisting of water and a lower molecular weight alcohol and subsequently precipitating the N-phenylisoglycosamines so produced from the reaction mixture and then isolating them.
10. A process for preparing N-phenyl-isoglycosamines which comprises the step of effecting a molecular rearrangement of the N-phenylaminoglycosides by subjecting the latter to the catalyzing action of about .002–.02 mol of an acid reacting medium per mol of the phenylaminoglycoside in 2–4 mols of a diluent selected from the group consisting of water and a lower molecular weight alcohol and then reducing the N-phenylisoglycosamines so produced to the corresponding N-polyhydroxyalkylphenylamines.
11. A process for preparing N-phenyl-isoglycosamines which comprises the step of effecting a molecular rearrangement of the N-phenylaminoglycosides by subjecting the latter to the catalyzing action of about .002–.02 mol of an acid reacting medium per mol of the phenylaminoglycoside in 2–4 mols of a diluent selected from the group consisting of water and a lower molecular weight alcohol and then reducing the N-phenyl-isoglycosamines so produced to the corresponding N-polyhydroxyalkylamines by subjecting the N-phenyl-isoglycosamines to catalytic hydrogenation.
12. A process for preparing N-phenyl-isoglycosamines which comprises the step of effecting a molecular rearrangement of the N-phenylaminoglycosides by subjecting the latter to the catalyzing action of about .002–.02 mol of an acid reacting medium per mol of the phenylaminoglycoside in 2–4 mols of a diluent selected from the group consisting of water and a lower molecular weight alcohol and then reducing the N-phenyl-isoglycosamines so produced to the corresponding N-polyhydroxyalkylphenylamines by subjecting the N-phenyl-isoglycosamines to catalytic hydrogenation in contact with a platinum catalyst.
13. A process for preparing N-phenyl-isoglycosamines which comprises the step of effecting a molecular rearrangement of the N-phenyl-aminoglycosides by subjecting the latter to the catalyzing action of about .002–.02 mol of an acid reacting medium per mol of the phenylaminoglycoside in 2–4 mols of a diluent selected from the group consisting of water and a lower molecular weight alcohol and then reducing the N-phenyl-isoglycosamines so produced to the corresponding N-polyhydroxyalkylphenylamines by subjecting the N-phenyl-isoglycosamines to catalytic hydrogenation while maintaining the reaction mixture weakly alkaline.

14. A process for preparing N-phenyl-isoglycosamines which comprises the step of effecting a molecular rearrangement of the N-phenyl-aminoglycosides by subjecting the latter to the catalyzing action of about .002–.02 mol of an acid reacting medium per mol of the phenylaminoglycoside in 2–4 mols of a diluent selected from the group consisting of water and a lower molecular weight alcohol and then reducing the N-phenyl-isoglycosamines so produced to the corresponding N-polyhydroxyalkylphenylamines by subjecting the N-phenyl-isoglycosamines to catalytic hydrogenation with a platinum catalyst under weakly alkaline conditions.

15. A process for preparing N-phenyl-isoglycosamines from N-phenylaminoglycosides which comprises effecting a molecular rearrangement of such N-phenylaminoglycosides by subjecting the same to the catalyzing action of about 0.002 mol–0.02 mol of an acid reacting medium per mol of N-phenylaminoglycoside in 2–4 mols of a diluent selected from the group consisting of water and a lower aliphatic alcohol.

16. A process for preparing N-phenyl-isoglycosamines from N-phenylaminoglycosides which comprises effecting a molecular rearrangement of such N-phenylaminoglycosides by subjecting the same to the catalyzing action of about 0.002 mol–0.02 mol of an acid reacting medium per mol of N-phenylaminoglycoside in 2–4 mols of water.

17. A process for preparing N-phenyl-isoglycosamines from N-phenylaminoglycosides which comprises effecting a molecular rearrangement of such N-phenylaminoglycosides by subjecting the same to the catalyzing action of about 0.002 mil–0.02 mol of an acid reacting medium per mol of N-phenylaminoglycoside in about 2–4 mols of water.

18. In a process for preparing a polyhydroxyalkylarylamine having the formula aryl—NH—CH$_2$—R R being a polyhydroxyalkyl group, the step which comprises heating an N-aryl-amino-glycoside at a temperature below its decomposition temperature with about .002–.02 mol of an acid reacting medium per mol of the arylaminoglycoside in 2–4 mols of water.

19. In a process for preparing a polyhydroxyalkylarylamine having the formula aryl—NH—CH$_2$(CHOH)$_3$CH$_2$OH the step which comprises heating an N-aryl-amino-pentoside at a temperature below its decomposition temperature with about .002–.02 mol of an acid reacting medium per mol of the arylaminopentoside in 2–4 mols of water.

20. In a process for preparing a polyhydroxyalkylarylamine having the formula 3,4-dimethylphenyl—NH—CH$_2$(CHOH)$_3$CH$_2$OH the step which comprises heating an N-(3,4-dimethylphenylamino)-pentoside at a temperature below its decomposition temperature with about .002–.02 mol of an acid reacting medium per mol of the phenylaminopentoside in 2–4 mols of water.

21. In a process for preparing a polyhydroxyalkylarylamine having the formula 3,4-dimethylphenyl-NH-ribityl the step which comprises heating an N-(3,4-dimethylphenylamino)-arabinoside at a temperature below its decomposition temperature with about .002–.02 mol of an acid reacting medium per mol of the phenylaminoarabinoside in 2–4 mols of water.

FRIEDRICH WEYGAND.

CERTIFICATE OF CORRECTION.

Patent No. 2,354,846.     FRIEDRICH WEYGAND.     August 1, 1944.

It is hereby certified that error appears in the printed specification of the above numbered patent requiring correction as follows: Page 2, first column, line 62, Example 5, for "periciptated" read --precipitated--; page 4, first column, line 52, Example 25, for "dl-iso" read --d-iso--; and second column, line 57, claim 11, for "N-polyhydroxyalkylamines" read --N-polyhydroxyalkylphenylamines--; page 5, second column, line 3-4, for "0.002 mil-0.02 mol" read --0.002 mol-0.02 mol--; and that the said Letters Patent should be read with this correction therein that the same may conform to the record of the case in the Patent Office.

Signed and sealed this 26th day of December, A. D. 1944.

Leslie Frazer (Seal)                     Acting Commissioner of Patents.

DISCLAIMER 2,354,846.—*Friedrich Weygand*, Heidelberg, Germany. N-POLYHYDROXYALKYL-PHENYLAMINES AND METHOD FOR THEIR PREPARATION. Patent dated Aug. 1, 1944. Disclaimer filed May 5, 1945, by the assignee, *Winthrop Chemical Company, Inc.*

Hereby enters this disclaimer to claim 17.

[*Official Gazette June 12, 1945.*]